United States Patent
Chang et al.

(10) Patent No.: US 9,158,641 B2
(45) Date of Patent: Oct. 13, 2015

(54) CLOUD AUTO-TEST SYSTEM, METHOD AND NON-TRANSITORY COMPUTER READABLE STORAGE MEDIUM OF THE SAME

(71) Applicant: INSTITUTE FOR INFORMATION INDUSTRY, Taipei (TW)

(72) Inventors: Ying-Wen Chang, New Taipei (TW); Chun-Chia Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 158 days.

(21) Appl. No.: 14/093,522

(22) Filed: Dec. 2, 2013

(65) Prior Publication Data

US 2015/0135015 A1  May 14, 2015

(30) Foreign Application Priority Data

Nov. 12, 2013  (TW) .............................. 102141139 A

(51) Int. Cl.
- *G06F 11/00* (2006.01)
- *G06F 11/26* (2006.01)
- *G06F 11/36* (2006.01)

(52) U.S. Cl.
CPC ................ *G06F 11/26* (2013.01); *G06F 11/36* (2013.01); *G06F 11/3692* (2013.01)

(58) Field of Classification Search
CPC ...... G06F 11/3692; G06F 11/26; G06F 11/36
USPC .............. 714/25, 4.1, 32, 38.1; 709/223, 224
See application file for complete search history.

(56) References Cited

U.S. PATENT DOCUMENTS

| | | | |
|---|---|---|---|
| 7,822,065 B2 * | 10/2010 | Lu | 370/469 |
| 8,839,035 B1 * | 9/2014 | Dimitrovich et al. | 714/25 |
| 2009/0300210 A1 * | 12/2009 | Ferris | 709/235 |
| 2011/0239241 A1 * | 9/2011 | Son et al. | 720/725 |
| 2012/0185913 A1 * | 7/2012 | Martinez et al. | 726/1 |
| 2013/0132774 A1 | 5/2013 | Somendra | |
| 2013/0247133 A1 * | 9/2013 | Price et al. | 726/1 |

* cited by examiner

*Primary Examiner* — Dieu-Minh Le
(74) *Attorney, Agent, or Firm* — CKC & Partners Co., Ltd.

(57) ABSTRACT

A cloud auto-test method used in a cloud auto-test system including a processing module is provided. The cloud auto-test method includes the steps outlined below. A test management virtual machine is constructed by the processing module. An under-test object is read to monitor and update the version of the under-test object. At least one test flow including at least one test item is established and managed. A test operation virtual machine is constructed such that the under-test object having the latest version is loaded to the test operation virtual machine. An auto-test process is performed on the under-test object in the test operation virtual machine according to the test flow. A result of the test process analyzed.

21 Claims, 3 Drawing Sheets

CLOUD AUTO-TEST SYSTEM, METHOD AND NON-TRANSITORY COMPUTER READABLE STORAGE MEDIUM OF THE SAME

RELATED APPLICATIONS

This application claims priority to Taiwan Application Serial Number 102141139, filed Nov. 12, 2013, which is herein incorporated by reference.

BACKGROUND

1. Field of Invention

The present invention relates to a cloud service technology. More particularly, the present invention relates to a cloud auto-test system, method and non-transitory computer readable storage medium of the same.

2. Description of Related Art

In cloud technology, the computer system is able to provide resources for data processing to remote devices through the network. The resources include the storage module, the processing module, the virtual machine or other kinds of computer resources. Parts of the conventional technologies allow programmers to establish application programs on a platform in the cloud system such that the application programs are operated in the virtual machines. The number of the virtual machines is determined by the programmers.

However, the conventional cloud services are not equipped with an efficient test technology to test the application programs. Accordingly, what is needed is a cloud auto-test system, method and non-transitory computer readable storage medium of the same to increase the efficiency and speed of the test process.

SUMMARY

The invention provides a cloud auto-test system. The cloud auto-test system includes at least one processing module. The processing module constructs at least one test management virtual machine. The test management virtual machine includes a version control unit, a test flow management unit, a virtual machine control unit, a test performing unit and a report and management unit. The version control unit reads at least one under-test object to monitor and update a version of the under-test object. The test flow management unit establishes and manages at least one test flow comprising at least one test item respectively. The virtual machine control unit establishes a test operation virtual machine such that the under-test object with a latest version is loaded to the test operation virtual machine. The test performing unit includes at least one test tool to perform an auto-test process on the under-test object in the test operation virtual machine according to the test flow. The report and management unit performs analysis on a test result generated by the test performing unit.

Another aspect of the present invention is to provide a cloud auto-test method used in a cloud auto-test system including at least one processing module. The cloud auto-test method includes the steps outlined below. A test management virtual machine is constructed by the processing module, wherein the test management virtual machine comprises a version control unit, a test flow management unit, a virtual machine control unit, a test performing unit and a report and management unit. At least one under-test object is read to monitor and update a version of the under-test object by the version control unit. At least one test flow including at least one test item respectively is established and managed by the test flow management unit. A test operation virtual machine is established by the virtual machine control unit such that the under-test object with a latest version is loaded to the test operation virtual machine. An auto-test process is performed on the under-test object in the test operation virtual machine according to the test flow by the test performing unit comprising at least one test tool. Analysis is performed on a test result generated by the test performing unit by the report and management unit.

Yet another aspect of the present invention is to provide a non-transitory computer readable storage medium to store a computer program to execute a cloud auto-test method used in a cloud auto-test system including at least one processing module. The cloud auto-test method includes the steps outlined below. A test management virtual machine is constructed by the processing module, wherein the test management virtual machine comprises a version control unit, a test flow management unit, a virtual machine control unit, a test performing unit and a report and management unit. At least one under-test object is read to monitor and update a version of the under-test object by the version control unit. At least one test flow including at least one test item respectively is established and managed by the test flow management unit. A test operation virtual machine is established by the virtual machine control unit such that the under-test object with a latest version is loaded to the test operation virtual machine. An auto-test process is performed on the under-test object in the test operation virtual machine according to the test flow by the test performing unit comprising at least one test tool. Analysis is performed on a test result generated by the test performing unit by the report and management unit.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
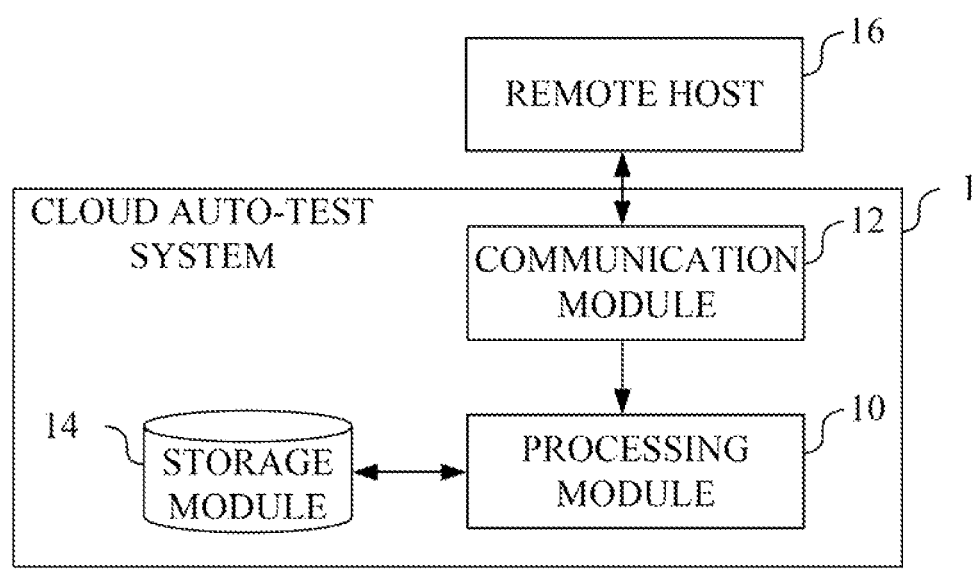
FIG. 1 is a block diagram of a cloud auto-test system in an embodiment of the present invention.

Reference will now be made in detail, to the present embodiments of the invention, examples of which are illustrated in the accompanying drawings. Wherever possible, the same reference numbers are used in the drawings and the description to refer to the same or like parts.

FIG. 1 is a block diagram of a cloud auto-test system 1 in an embodiment of the present invention. The cloud auto-test system 1 includes a processing module 10, a communication module 12 and a storage module 14.

The processing module 10 can be any processor equipped with data operation ability. For example, the processing module 10 can be a central processing unit (CPU), a control unit, a micro processor or other hardware component that is able to execute commands. The processing module 10 further performs data transmission with the communication module 12 through different data transmission paths to communicate with external electronic devices.

The communication module 12 is coupled to the processing module 10. The communication module 12 communicates with the processing module 10 through different data transmission paths. The communication module 12 can be such as but not limited to a wired network card, a wireless network card or other kinds of network communication module. The processing module 10 is able to drive the communication module 12 to communicate with external electronic devices by using any possible form or specification of network communication technology.

The storage module 14 is coupled to the processing module 10. In different embodiments, the storage module 14 may include such as, but not limited to a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The storage module 14 stores a plurality of computer executable commands. The processing module 10 executes the commands to provide the function of the cloud auto-test system 1. The operations of the processing module 10 are discussed in detail with respect to FIG. 2.

Figure 2:
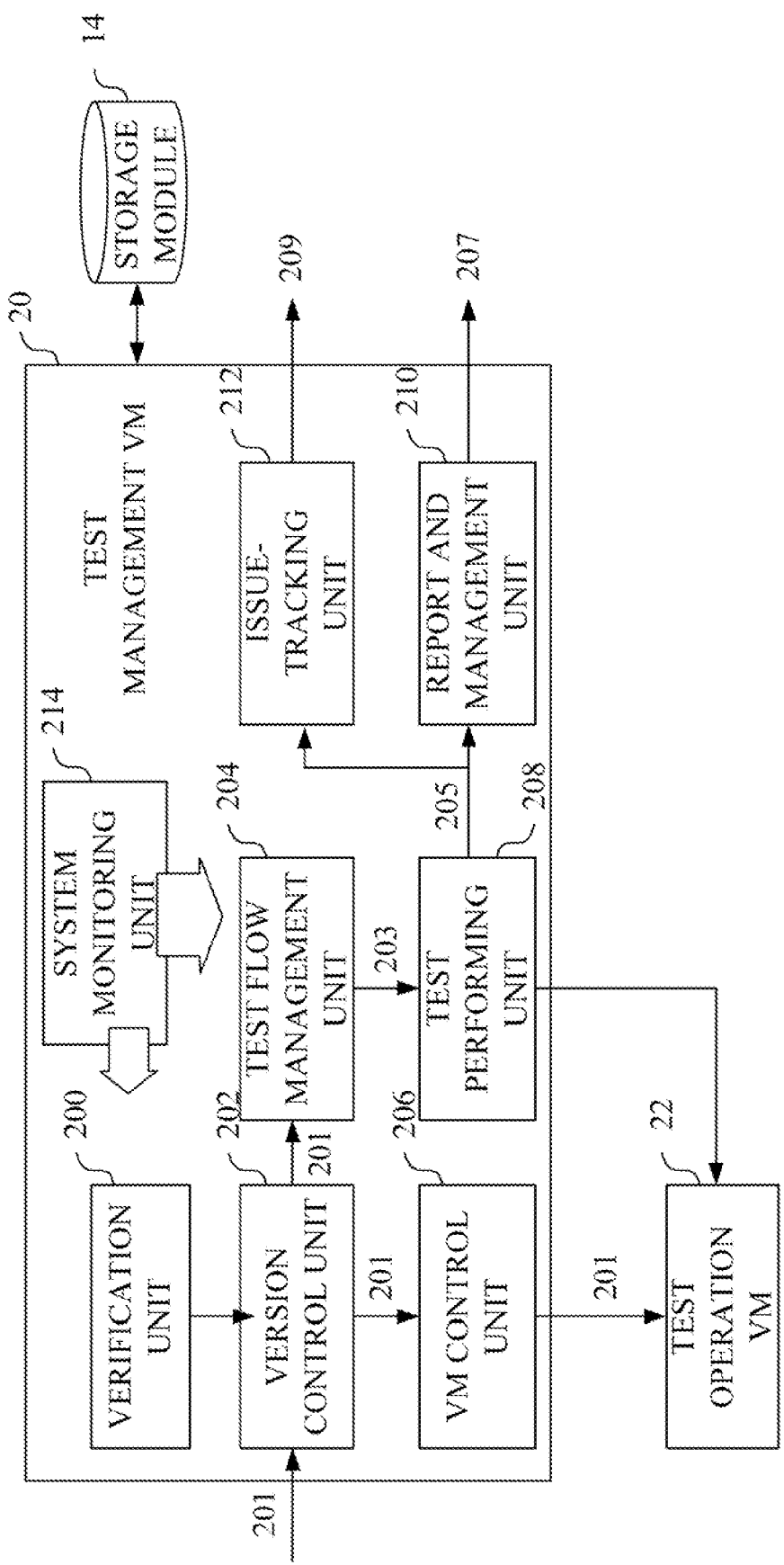
FIG. 2 is a block diagram of a test management virtual machine constructed by the processing module in FIG. 1 and the storage module in an embodiment of the present invention.

FIG. 2 is a block diagram of a test management virtual machine (VM) 20 constructed by the processing module 10 in FIG. 1 and the storage module 14 in an embodiment of the present invention.

The processing module 10 constructs the test management virtual machine 20. In the present embodiment, the test management virtual machine 20 includes a verification unit 200, a version control unit 202, a test flow management unit 204, a virtual machine control unit 206, a test performing unit 208, a report and management unit 210, an issue-tracking unit 212 and a system monitoring unit 214.

The verification unit 200 verifies a remote host 16 through the communication module 12 illustrated in FIG. 1. The remote host 16 is allowed to access the test management virtual machine 20 through the communication module 12 after the remote host 16 is verified. In an embodiment, the verification unit 200 receives verification data from the remote host 16 such as but not limited to data including accounts and passwords. The verification is performed according to such as but not limited to data from a verification database (not shown).

The version control unit 202 retrieves and reads an under-test object 201 from the remote host 16 through the communication module 12 illustrated in FIG. 1. In an embodiment, the under-test object 201 includes a source code, a relative document or a combination of the above. The version control unit 202 monitors and updates a version of the under-test object 201 such that the under-test object 201 is updated to the latest version as soon as possible.

The test flow management unit 204 establishes and manages at least one test flow 203 including at least one test item respectively. In an embodiment, the test flow 203 is established according to the content or the type of the under-test object 201.

In different embodiments, the test item may include such as but not limited to at least one security test item, at least one pressure test item, at least one function test item or a combination of the above. The security test item may include such as but not limited to a white-box test, a black-box test and a vulnerability scan. The white-box test is a static source code security test (e.g. source code analysis) performed by using test tool to search the vulnerability of buffer overflow. The black-box test is a dynamic source code security test that does not need to retrieve the source code and is able to determine whether the under-test object includes any one of the top ten vulnerabilities defined in OWASP (Open Web Application Security Project). The vulnerability scan is a process designed to automatically detect the security vulnerabilities of remote or local hosts. The pressure test item applies stress on the system resources to observe the kind of pressure that makes the system crash, the part of the system that crashes under the pressure and whether the system is able to be turned off and recovered after the system crashes. The function test item performs tests related to system functions.

The virtual machine control unit 206 establishes a test operation virtual machine 22 such that the under-test object 201 is loaded to the test operation virtual machine 22. In an embodiment, the virtual machine control unit 206 allocates the resources of the test operation virtual machine 22 according to the latest version of the under-test object 201 by using a mechanism of continuous integration (CI). The resources of the test operation virtual machine 22 include the usage of the processing module 10 and the storage module 14 of the cloud auto-test system 1 as illustrated in FIG. 1.

The test performing unit 208 includes at least one test tool (not shown) to perform an auto-test process on the under-test object 201 in the test operation virtual machine 22 according to the test flow. In an embodiment, the test performing unit 208 analyzes the source codes and performs security tests first and performs function tests and pressure tests according to various kinds of test tools subsequently after the under-test object 201 is loaded. In an embodiment, the auto-test process mentioned above is performed by using such as but not limited to a remote launcher mechanism.

In an embodiment, the virtual machine control unit 206 further turns off the test operation virtual machine 22 when the auto-test process performed according to the test flow is finished.

The report and management unit 210 performs analysis on a test result 205 generated by the test performing unit 208. In an embodiment, the report and management unit 210 generates a test result organized report 207 after the analysis. The test result organized report 207 not only includes the content of a common log file, but also includes the content of statistic and quality analysis.

The issue-tracking unit 212 generates an issue list 209 according to the test result 205 generated by the test performing unit 208. The issue list 209 may include such as but not limited to the type of the issue, the item of the issue, the staff in charge of the issue or a combination of the above. The issue-tracking unit 212 further transmits the issue list 209 to a remote host corresponding to the staff to manage and track the issue according to the issue list 209. Whether the issue is dealt with or resolved can be confirmed.

Though not shown in the diagram, the system monitoring unit 214 is actually coupled to each of the units in the test management virtual machine 20 mentioned above. The system monitoring unit 214 monitors and records a system action of the test management virtual machine 20. In an embodiment, the test result organized report 207, the issue list 209 and the system action recorded by the system monitoring unit 214 are stored in the storage module 14 for the users reference.

Accordingly, the cloud auto-test system 1 is able to keep updating the under-test object (e.g. source codes) to the latest version. The under-test object with the latest version can be automatically loaded to the test operation virtual machine 22 for testing. It is not necessary to manually load the under-test object to reallocate the resources every time the under-test object is updated. The efficiency of the auto-test process is greatly increased. Further, the test result organized report 207 generated by the report and management unit 210 and the issue list 209 generated by the issue-tracking unit 212.

It is noted that in the above embodiments, only one test management virtual machine 20 is used as an example. In other embodiments, the processing module 10 can construct a multiple of test management virtual machines to perform different test processes at the same time to accomplish a better test efficiency.

Figure 3:
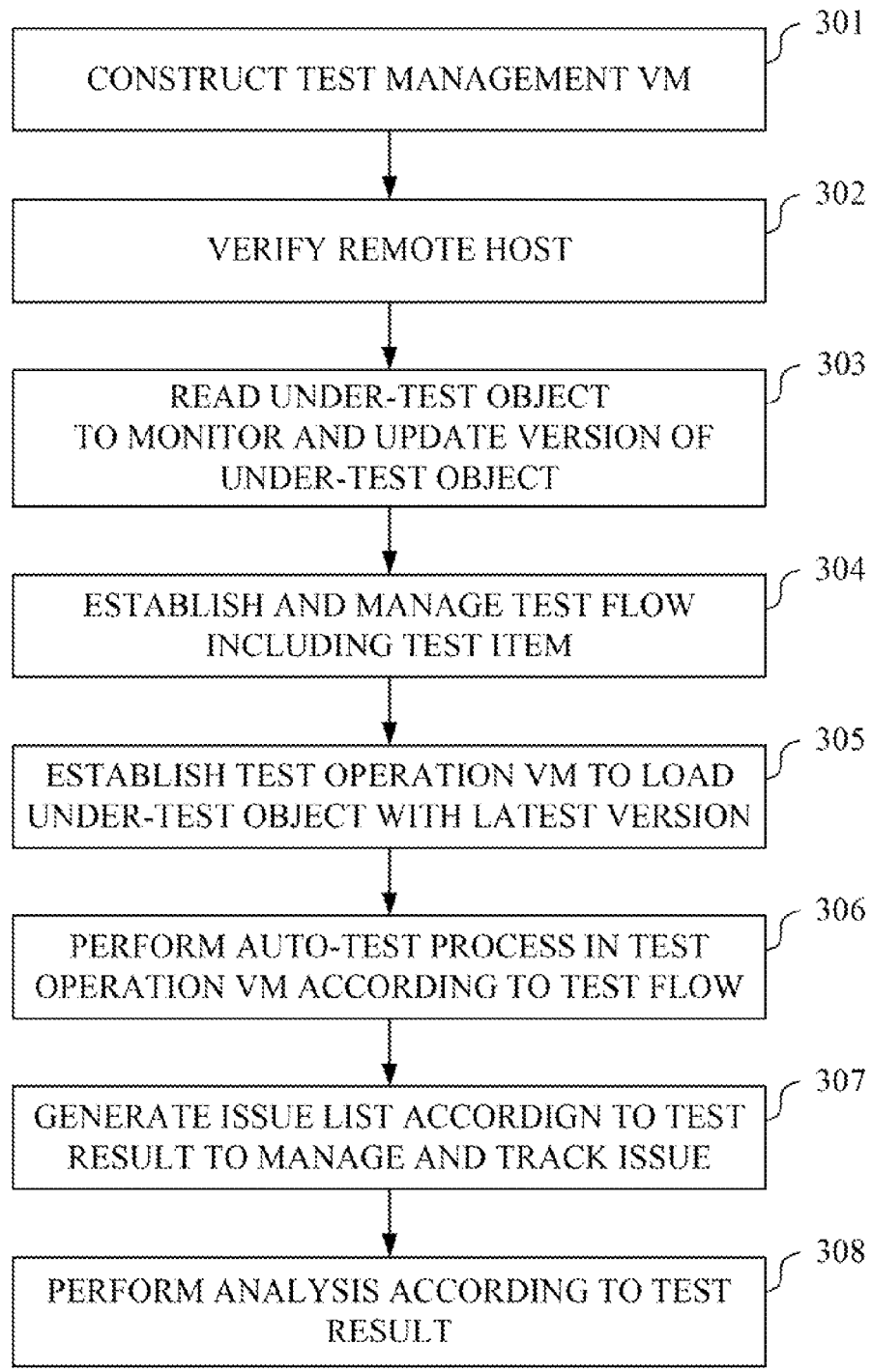
FIG. 3 is a flow chart of a cloud auto-test method in an embodiment of the present invention.

FIG. 3 is a flow chart of a cloud auto-test method 300 in an embodiment of the present invention, The cloud auto-test method 300 can be used in the cloud auto-test system 1 depicted in FIG. More specifically, the cloud auto-test method 300 is implemented by using a computer program to control the modules in the cloud auto-test system 1. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The cloud auto-test method 300 comprises the steps outlined below. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the processing module 10 constructs the test management virtual machine 20.

In step 302, the verification unit 200 verifies a remote host 16 through the communication module 12.

In step 303, the version control unit 202 reads the under-test object 201 from the remote host 16 to monitor and update a version of the under-test object 201.

In step 304, the test flow management unit 204 establishes and manages the test flow 203 including the test item respectively.

In step 305, the virtual machine control unit 206 establishes the test operation virtual machine 22 such that the under-test object 201 with a latest version is loaded to the test operation virtual machine 22.

In step 306, the test performing unit 208 including the test tool performs the auto-test process on the under-test object 201 in the test operation virtual machine 22 according to the test flow 203. In different embodiments, the test item may include such as but not limited to at least one security test item, at least one pressure test item, at least one function test item or a combination of the above.

In step 307, the issue-tracking unit 212 generates the issue list 209 according to the test result 205 generated by the test performing unit 208 to manage and track the issue.

In step 308, the report and management unit 210 performs the analysis on a test result 205 generated by the test performing unit 208.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A cloud auto-test system, comprising:
   at least one processing module to construct at least one test management virtual machine comprising:
   a version control unit to read at least one under-test object to monitor and update a version of the under-test object;
   a test flow management unit to establish and manage at least one test flow comprising at least one test item respectively;
   a virtual machine control unit to establish a test operation virtual machine such that the under-test object with a latest version is loaded to the test operation virtual machine;
   a test performing unit comprising at least one test tool to perform an auto-test process on the under-test object in the test operation virtual machine according to the test flow; and
   a report and management unit to perform analysis on a test result generated by the test performing unit.

2. The cloud auto-test system of claim 1, further comprising a communication module coupled to the processing module, and the test management virtual machine further comprises a verification unit to verify a remote host through the communication module, wherein the remote host is allowed to access the test management virtual machine through the communication module after the remote host is verified.

3. The cloud auto-test system of claim 2, wherein the version control unit retrieves the under-test object through the communication module.

4. The cloud auto-test system of claim 1, further comprising a storage module coupled to the processing module, the virtual machine control unit allocates resources of the test operation virtual machine according to the version of the under-test object, wherein the resources comprises a usage of the processing module and the storage module.

5. The cloud auto-test system of claim 1, wherein the virtual machine control unit further turns off the test operation virtual machine when the auto-test process performed according to the test flow is finished.

6. The cloud auto-test system of claim 1, wherein the test management virtual machine further comprises an issue-tracking unit to generate an issue list according to the test result generated by the test performing unit and transmit the issue list to a corresponding remote host to manage and track at least one issue according to the issue list.

7. The cloud auto-test system of claim 1, wherein the report and management unit generates a test result organized report comprising at least one statistic and quality analysis.

8. The cloud auto-test system of claim 1, wherein the test management virtual machine further comprises a system monitoring unit to monitor and record a system action of the test management virtual machine.

9. The cloud auto-test system of claim 1, wherein the test item comprises at least one security test item, at least one pressure test item, at least one function test item or a combination of the above.

10. The cloud auto-test system of claim 1, wherein the under-test object comprises a source code, a relative document or a combination of the above.

11. A cloud auto-test method used in a cloud auto-test system comprising at least one processing module, wherein the cloud auto-test method comprises:

constructing a test management virtual machine by the processing module, wherein the test management virtual machine comprises a version control unit, a test flow management unit, a virtual machine control unit, a test performing unit and a report and management unit;

reading at least one under-test object to monitor and update a version of the under-test object by the version control unit;

establishing and managing at least one test flow comprising at least one test item respectively by the test flow management unit;

establishing a test operation virtual machine by the virtual machine control unit such that the under-test object with a latest version is loaded to the test operation virtual machine;

performing an auto-test process on the under-test object in the test operation virtual machine according to the test flow by the test performing unit comprising at least one test tool; and performing analysis on a test result generated by the test performing unit by the report and management unit.

12. The cloud auto-test method of claim 11, wherein the cloud auto-test system further comprises a communication module coupled to the processing module, and the test management virtual machine further comprises a verification unit, the cloud auto-test method further comprises:

verifying a remote host through the communication module by the verification unit, wherein the remote host is allowed to access the test management virtual machine through the communication module after the remote host is verified.

13. The cloud auto-test method of claim 12, wherein the version control unit retrieves the under-test object through the communication module.

14. The cloud auto-test method of claim 11, wherein the cloud auto-test system further comprises a storage module coupled to the processing module, the step of establishing the test operation virtual machine by the virtual machine control unit further comprises:

allocating resources of the test operation virtual machine according to the version of the under-test object by the virtual machine control unit, wherein the resources comprises a usage of the processing module and the storage module.

15. The cloud auto-test method of claim 11, further comprising turning off the test operation virtual machine by the virtual machine control unit when the auto-test process performed according to the test flow is finished.

16. The cloud auto-test method of claim 11, wherein the test management virtual machine further comprises an issue-tracking unit, the cloud auto-test method further comprises:

generating an issue list according to the test result generated by the test performing unit and transmitting the issue list to a corresponding remote host to manage and track at least one issue according to the issue list.

17. The cloud auto-test method of claim 11, further comprising:

generating a test result organized report comprising at least one statistic and quality analysis by the report and management unit.

18. The cloud auto-test method of claim 11, wherein the test management virtual machine further comprises a system monitoring unit, the cloud auto-test method further comprises:

monitoring and recording a system action of the test management virtual machine.

19. The cloud auto-test method of claim 11, wherein the test item comprises at least one security test item, at least one pressure test item, at least one function test item or a combination of the above.

20. The cloud auto-test method of claim 11, wherein the under-test object comprises a source code, a relative document or a combination of the above.

21. A non-transitory computer readable storage medium to store a computer program to execute a cloud auto-test method used in a cloud auto-test system comprising at least one processing module, the cloud auto-test method comprises:

constructing a test management virtual machine by the processing module, wherein the test management virtual machine comprises a version control unit, a test flow management unit, a virtual machine control unit, a test performing unit and a report and management unit;

reading at least one under-test object to monitor and update a version of the under-test object by the version control unit;

establishing and managing at least one test flow comprising at least one test item respectively by the test flow management unit;

establishing a test operation virtual machine by the virtual machine control unit such that the under-test object with a latest version is loaded to the test operation virtual machine;

performing an auto-test process on the under-test object in the test operation virtual machine according to the test flow by the test performing unit comprising at least one test tool; and performing analysis on a test result generated by the test performing unit by the report and management unit.

* * * * *